(12) United States Patent
Tabata

(10) Patent No.: US 11,975,760 B2
(45) Date of Patent: May 7, 2024

(54) VEHICULAR RECORDING CONTROLLER APPARATUS, VEHICULAR RECORDER APPARATUS, VEHICULAR RECORDING CONTROLLING METHOD, AND COMPUTER PROGRAM

(71) Applicant: JVCKENWOOD Corporation, Yokohama (JP)

(72) Inventor: Kiyofumi Tabata, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 935 days.

(21) Appl. No.: 16/992,167

(22) Filed: Aug. 13, 2020

(65) Prior Publication Data

US 2020/0369319 A1 Nov. 26, 2020

Related U.S. Application Data

(63) Continuation of application No. PCT/JP2019/023551, filed on Jun. 13, 2019.

(30) Foreign Application Priority Data

Nov. 14, 2018 (JP) .................................. 2018-213664

(51) Int. Cl.
*B60R 1/00* (2022.01)
*B62D 15/02* (2006.01)
(Continued)

(52) U.S. Cl.
CPC ........ *B62D 15/0275* (2013.01); *G06T 7/0002* (2013.01); *G06T 7/70* (2017.01);
(Continued)

(58) Field of Classification Search
CPC . B62D 15/0275; B60R 1/00; B60R 2300/806; B60R 25/302; B60R 25/305;
(Continued)

(56) References Cited

U.S. PATENT DOCUMENTS

2013/0117078 A1 5/2013 Weik et al.
2013/0135473 A1 5/2013 Lin et al.
(Continued)

FOREIGN PATENT DOCUMENTS

DE 102016214860 A1 * 2/2018 ....... G08B 13/19647
EP 2804152 11/2014
(Continued)

OTHER PUBLICATIONS

Machine Translation of JP2017195755A (Year: 2017).*
Machine Translation of JP-2006036066-A (Year: 2006).*
Machine Translation of DE-102016214860-A1 (Year: 2018).*
Machine Translation of WO-2016199287-A1 (Year: 2016).*
(Continued)

*Primary Examiner* — Faris S Almatrahi
*Assistant Examiner* — Sahar Motazedi
(74) *Attorney, Agent, or Firm* — Amin, Turocy & Watson, LLP

(57) ABSTRACT

A vehicular recording controller apparatus includes: a video data acquiring unit that acquires video data captured by a camera capturing a video of the setting around a vehicle; an event detecting unit that detects an event on the vehicle; a position determining unit that determines whether the position of the vehicle is within the field of view of an external camera making a video available for use by a user of the vehicle; and a recording function control unit that controls a parking-mode recording function for storing video data captured by the camera when the event detecting unit detects an event while the vehicle is parked.

8 Claims, 11 Drawing Sheets

(51) Int. Cl.
*G06K 9/00* (2022.01)
*G06T 7/00* (2017.01)
*G06T 7/70* (2017.01)
*G06V 20/40* (2022.01)
*G06V 20/56* (2022.01)
*H04N 5/232* (2006.01)
*H04N 23/66* (2023.01)

(52) U.S. Cl.
CPC .............. *G06V 20/41* (2022.01); *G06V 20/56* (2022.01); *H04N 23/66* (2023.01); *B60R 2300/806* (2013.01); *G06T 2207/30264* (2013.01); *G06V 20/44* (2022.01)

(58) Field of Classification Search
CPC ...................... G06T 7/0002; G06T 7/70; G06T 2207/30264; G06V 20/41; G06V 20/56; G06V 20/44; H04N 23/66; H04N 5/77; H04N 7/18; H04N 5/915; H04N 7/181; G08B 13/19647; G08B 13/19695; G07C 5/0866
See application file for complete search history.

(56) References Cited

U.S. PATENT DOCUMENTS

| | | | | |
|---|---|---|---|---|
| 2014/0225719 | A1* | 8/2014 | Kesavan | H04W 4/38 340/425.5 |
| 2016/0318482 | A1* | 11/2016 | Cogill | B60R 25/31 |
| 2018/0218582 | A1* | 8/2018 | Hodge | G06F 16/7837 |
| 2021/0274130 | A1* | 9/2021 | Nodder | G08B 25/008 |

FOREIGN PATENT DOCUMENTS

| | | | | |
|---|---|---|---|---|
| JP | 2002-367094 | | 12/2002 | |
| JP | 2004-64696 | | 2/2004 | |
| JP | 2006036066 | A * | 2/2006 | |
| JP | 2011-90645 | | 5/2011 | |
| JP | 2017-195755 | | 10/2017 | |
| JP | 2018-055630 | | 4/2018 | |
| WO | WO-2016199287 | A1 * | 12/2016 | ............... G07C 5/00 |

OTHER PUBLICATIONS

Extended European Search Report for European Patent Application No. 19884240.3 dated Dec. 17, 2020.
International Search Report and Written Opinion for International Application No. PCT/JP2019/023551 dated Aug. 27, 2019, 11 pages.

* cited by examiner

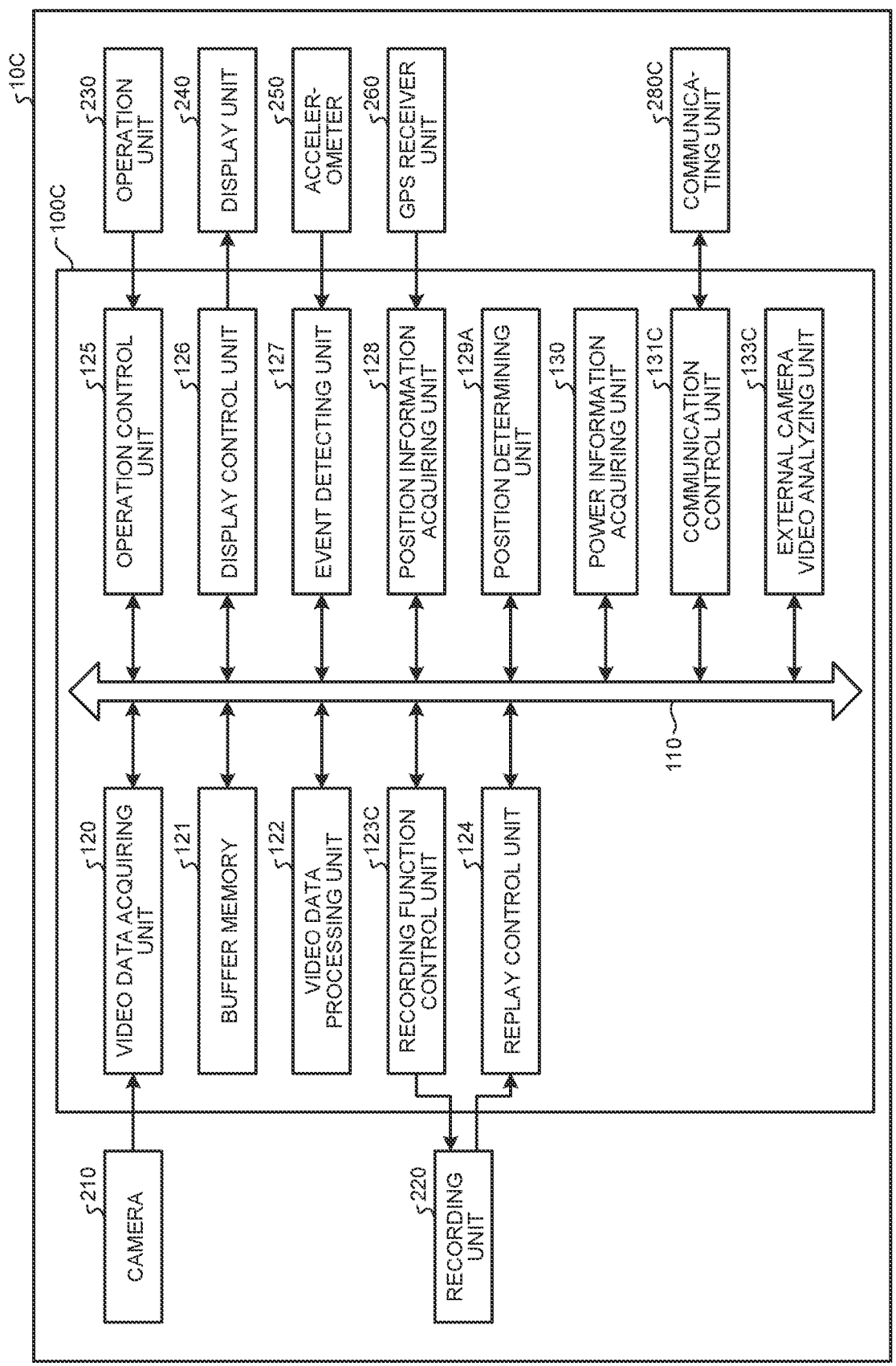

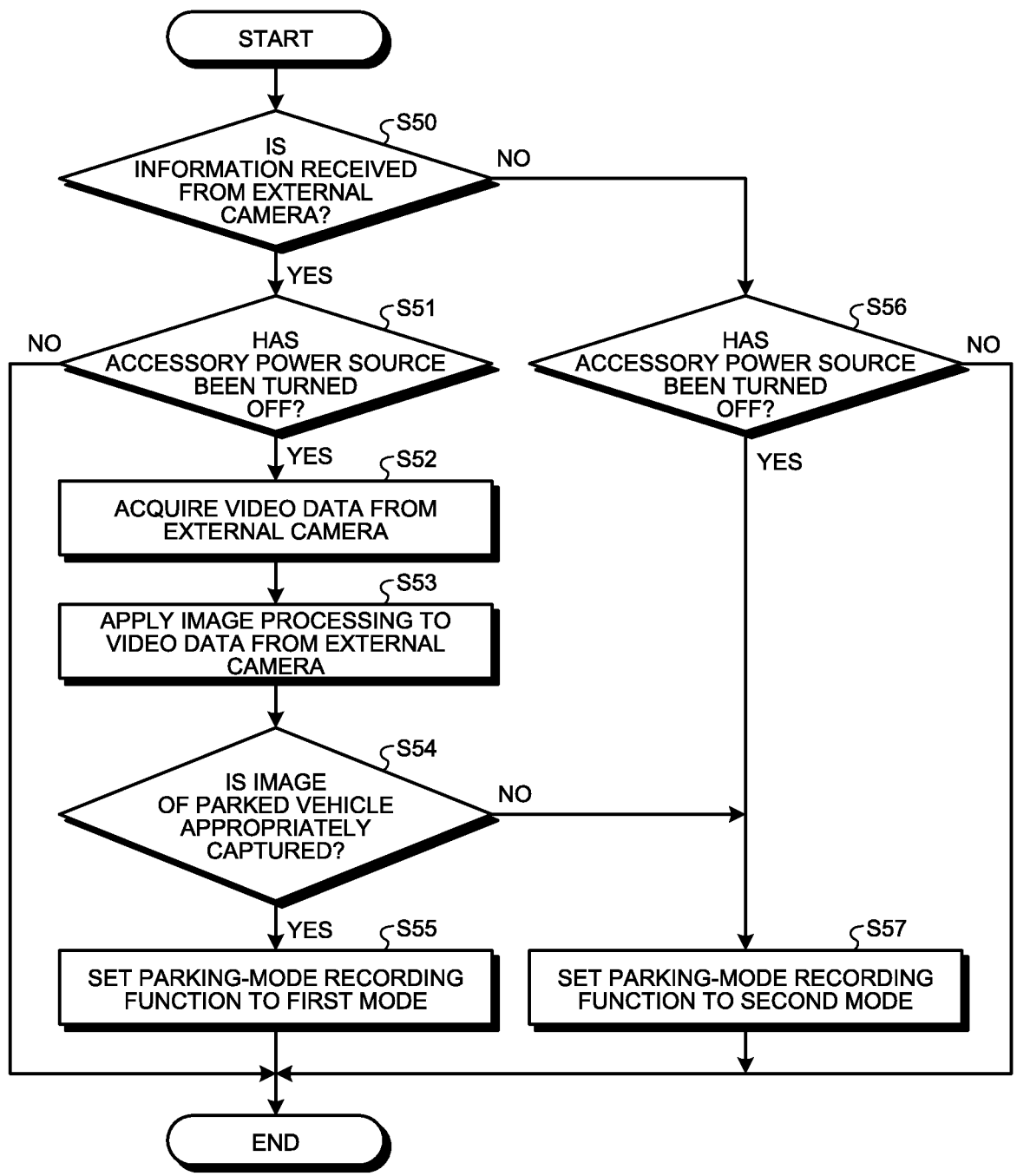

VEHICULAR RECORDING CONTROLLER APPARATUS, VEHICULAR RECORDER APPARATUS, VEHICULAR RECORDING CONTROLLING METHOD, AND COMPUTER PROGRAM

CROSS-REFERENCE TO RELATED APPLICATION(S)

This application is a Continuation of PCT international application Ser. No. PCT/JP2019/023551 filed on Jun. 13, 2019 which designates the United States, incorporated herein by reference, and which claims the benefit of priority from Japanese Patent Application No. 2018-213664, filed on Nov. 14, 2018, incorporated herein by reference.

BACKGROUND

1. Technical Field

The present disclosure relates to a vehicular recording controller apparatus, a vehicular recorder apparatus, a vehicular recording controlling method, and a computer program.

2. Description of the Related Art

There is a vehicular recorder apparatus having a parking-mode recording function for recording an event having occurred while the vehicle is parked. For the parking-mode recording function, a technology for allowing the vehicular recorder apparatus to operate by receiving the power supply of an internal battery or the battery of the vehicle is known. Also known is a technology for reducing the power consumption so that the operable time is extended, by running a function for detecting an event while the vehicle is parked, and triggering recording after an event is detected.

When power supply from the internal battery of the vehicular recorder apparatus or the battery of the vehicle is used, the operable time is bounded by the amount of remaining battery charge. Furthermore, in the configuration in which the recording is started after an event is detected, neither the video data at the time of the event detection nor that before the event detection is recorded. These factors may obstruct appropriate understanding of the situation in which the event is detected, based on the video data.

SUMMARY

It is an object of the present disclosure to at least partially solve the problems in the conventional technology.

To solve the above problem and achieve the above object, a vehicular recording controller apparatus according to the present disclosure comprising: a video data acquiring unit that acquires video data captured by a video capturing unit capturing a video of a setting around a vehicle; an event detecting unit that detects an event on the vehicle; a position determining unit that determines whether a position of the vehicle is within a field of view of an external camera making a video available for use by a user of the vehicle; and a recording function control unit that controls a parking-mode recording function for storing the video data captured by the video capturing unit when the event detecting unit detects an event while the vehicle is parked, wherein the recording function control unit sets the parking-mode recording function to a first mode when the position determining unit determines that the vehicle is stopped within the field of view of the external camera, and sets the parking-mode recording function to a second mode that is different from the first mode when the position determining unit determines that the vehicle is stopped outside the field of view of the external camera.

A vehicular recorder apparatus according to the present disclosure comprising: the vehicular recording controller apparatus above; and at least one of a video capturing unit that captures a video of a setting around the vehicle, and a recording unit that stores the video data.

A vehicular recording controlling method according to the present disclosure comprising: a video data acquisition step of acquiring video data captured by a video capturing unit capturing a video of a setting around a vehicle; an event detection step of detecting an event on the vehicle; a position determination step of determining whether a position of the vehicle is within a field of view of an external camera making a video available for use by a user of the vehicle; and a recording function control step of controlling a parking-mode recording function for storing the video data captured by the video capturing unit when an event is detected at the event detection step, while the vehicle is parked, wherein at the recording function control step, the parking-mode recording function is set to a first mode when it is determined at the position determination step that the vehicle is stopped within the field of view of the external camera, and the parking-mode recording function is set to a second mode that is different from the first mode when it is determined at the position determination step that the vehicle is stopped outside the field of view of the external camera.

A non-transitory computer readable recording medium storing therein a computer program according to the present disclosure causing a computer operating as a vehicular recording controller apparatus to execute: a video data acquisition step of acquiring video data captured by a video capturing unit capturing a video of a setting around a vehicle; an event detection step of detecting an event on the vehicle; a position determination step of determining whether a position of the vehicle is within a field of view of an external camera making a video available for use by a user of the vehicle; and a recording function control step of controlling a parking-mode recording function for storing the video data captured by the video capturing unit when an event is detected at the event detection step while the vehicle is parked, wherein at the recording function control step, the parking-mode recording function is set to a first mode when it is determined at the position determination step that the vehicle is stopped within the field of view of the external camera, and the parking-mode recording function is set to a second mode that is different from the first mode when it is determined at the position determination step that the vehicle is stopped outside the field of view of the external camera.

BRIEF DESCRIPTION OF THE DRAWINGS

FIG. 10 is a block diagram illustrating an exemplary configuration of a vehicular recorder apparatus including a vehicular recording controller apparatus according to a fifth embodiment.

FIG. 11 is a flowchart illustrating the sequence of a process performed by the vehicular recording controller apparatus according to the fifth embodiment.

DETAILED DESCRIPTION

Some embodiments of a vehicular recording controller apparatus, a vehicular recorder apparatus, a vehicular recording controlling method, and a computer program according to the present disclosure will now be explained in detail with reference to the appended drawings. The embodiments described below are, however, not intended to limit the scope of the present disclosure in any way.

First Embodiment

Figure 1:
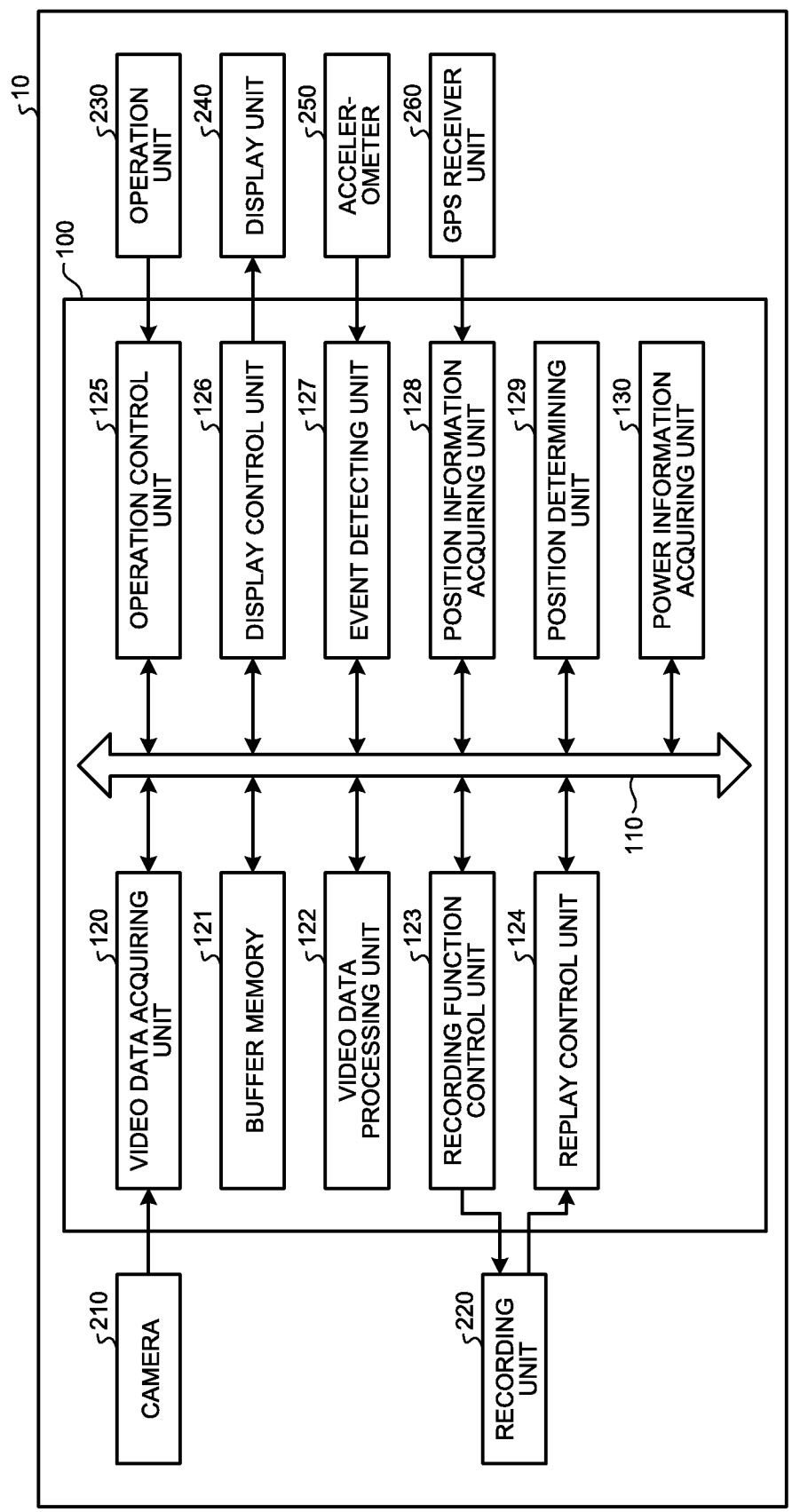
FIG. 1 is a block diagram illustrating an exemplary configuration of a vehicular recorder apparatus including a vehicular recording controller apparatus according to a first embodiment.

FIG. 1 is a block diagram illustrating an exemplary configuration of a vehicular recorder apparatus including a vehicular recording controller apparatus according to a first embodiment. This vehicular recorder apparatus 10 sets the parking-mode recording function differently, between when the vehicle is parked within the field of view of an external camera, and when the vehicle is parked outside the field of view.

The external camera is a camera configured to capture a video of some area including a parking space. The external camera is a camera from which the user of the vehicular recorder apparatus 10 can acquire data. The external camera is installed in a parking space in a user's house, or a parking space in a user's working place, for example. The external camera includes those from which a user can acquire data, among those installed in a parking space of a store or the like, for example. The external camera does not include those that are installed in a parking space of a store or the like but from which the user cannot obtain data, for example.

The vehicular recorder apparatus 10 may be a recorder that is onboard a vehicle, or a portable recorder that is usable onboard the vehicle. The vehicular recorder apparatus 10 includes a camera (video capturing unit) 210, a recording unit 220, an operation unit 230, a display unit 240, an accelerometer 250, a global positioning system (GPS) receiver unit 260, and a vehicular recording controller apparatus 100.

The camera 210 is a camera that captures a video of the setting around the vehicle. In this embodiment, the camera 210 is explained to be an omnidirectional camera capable of covering a field of view of 360 degrees, but may also be a camera facing one direction, or a set of a plurality of cameras each of which captures a video of the setting in the corresponding direction, without limitation to the omnidirectional camera. The camera 210 is disposed on the front side of the cabin of the vehicle, for example. The camera 210 keeps recording a video during the time from when the engine is started to when the engine is stopped, that is, during the time in which the vehicle is operating. In this embodiment, the camera 210 keeps capturing a video while the accessory power source of the vehicle is ON. In this embodiment, when an event is detected while the accessory power source is OFF, that is, while the vehicle is parked, the camera 210 is enabled to store a video corresponding to a predetermined time period the length of which is, for example, several tens of seconds or so. The camera 210 outputs the data of the captured video to a video data acquiring unit 120 included in the vehicular recording controller apparatus 100. The video data consists of dynamic images of 30 frames or so per seconds, for example.

The recording unit 220 is, for example, used for temporarily storing therein data in the vehicular recorder apparatus 10. The recording unit 220 is a recording unit, such as a random access memory (RAM), a semiconductor memory such as a flash memory, or a memory card. The recording unit 220 may also be an external recording unit that is connected wirelessly via a communication device not illustrated. The recording unit 220 records a piece of loop-recorded video data or event-recorded data, based on a control signal output from a recording function control unit 123 included in the vehicular recording controller apparatus 100.

The operation unit 230 is enabled to receive various operations performed on the vehicular recorder apparatus 10. For example, the operation unit 230 is enabled to receive an operation for storing captured video data manually in the recording unit 220. As another example, the operation unit 230 is enabled to receive an operation for replaying the loop-recorded video data or the event-recorded data that is recorded in the recording unit 220. As another example, the operation unit 230 is enabled to receive an operation for deleting the event-recorded data recorded in the recording unit 220. As another example, the operation unit 230 is enabled to receive an operation for ending loop-recording. The operation unit 230 outputs information of such operations to an operation control unit 125 included in the vehicular recording controller apparatus 100.

The display unit 240 is, for example, an independent display device provided to the vehicular recorder apparatus 10, or a common display device shared with another system such as a navigation system. The display unit 240 may be integrated with the camera 210. The display unit 240 is a display such as a liquid-crystal display (LCD) or an organic electro-luminescence (EL) display. In this embodiment, the display unit 240 is disposed on the dashboard, the instrument panel, or the center console, for example, positioned in front of the driver of the vehicle. The display unit 240 displays a video based on a video signal output from a display control unit 126 included in the vehicular recording controller apparatus 100. The display unit 240 displays a video currently being captured by the camera 210, or a video having been recorded in the recording unit 220.

The accelerometer 250 is a sensor that detects the acceleration of the vehicle. In this embodiment, the accelerometer 250 detects the acceleration as a change in the velocity of the vehicle. The accelerometer 250 outputs the detection result to an event detecting unit 127 included in the vehicular recording controller apparatus 100. The accelerometer 250 is a sensor that detects accelerations in three axial directions, for example. The three axial directions are the front-and-back direction, the right-and-left direction, and the up-and-down direction of the vehicle.

The GPS receiver unit 260 receives electric waves from a GPS satellite not illustrated. The GPS receiver unit 260 outputs a signal corresponding to the received electric waves to a position information acquiring unit 128 included in the vehicular recording controller apparatus 100.

The vehicular recording controller apparatus 100 is a processor (controller) implemented as a central processing unit (CPU), for example. The vehicular recording controller apparatus 100 loads a computer program that is in storage, onto a memory, and executes instructions included in the computer program. The vehicular recording controller apparatus 100 includes an internal memory not illustrated, and the internal memory is used as a temporary data storage of the vehicular recording controller apparatus 100. The vehicular recording controller apparatus 100 includes the video data acquiring unit 120, a buffer memory 121, a video data processing unit 122, the recording function control unit 123, a replay control unit 124, the operation control unit 125, the display control unit 126, the event detecting unit 127, the position information acquiring unit 128, a position determining unit 129, and a power information acquiring unit 130, all of which are connected to a bus 110.

The video data acquiring unit 120 acquires video data resultant of capturing a video of the setting around the vehicle. More specifically, the video data acquiring unit 120 acquires the video data output from the camera 210, and outputs the video data to the buffer memory 121.

The buffer memory 121 is an internal memory provided to the vehicular recording controller apparatus 100, and is a memory that temporarily stores therein video data corresponding to a certain length of time while updating the video data, the video data being acquired by the video data acquiring unit 120.

The video data processing unit 122 converts video data that is temporarily stored in the buffer memory 121 into data encoded in a certain format, e.g., the Moving Picture Experts Group (MPEG)-4 format, by encoding the data with a codec that uses a corresponding algorithm such as H.264 or MP4 algorithm. The video data processing unit 122 generates video data that is a file corresponding to a certain length of time, based on the video data that is temporarily stored in the buffer memory 121. As a specific example, the video data processing unit 122 generates video data corresponding to 60 seconds as a file, in the order in which pieces of data are recorded, based on the video data that is temporarily stored in the buffer memory 121. The video data processing unit 122 outputs the generated video data to the recording function control unit 123. The video data processing unit 122 also outputs the generated video data to the display control unit 126. Explained above is an example in which the time length of the video data generated as a file is 60 seconds, but the present disclosure is not limited thereto. The video data herein may also be data containing audio, as well as the video captured by the camera 210.

The recording function control unit 123 controls to record the video data files converted by the video data processing unit 122, in the recording unit 220. The recording function control unit 123 records the files of the video data converted by the video data processing unit 122 in the recording unit 220, as overwritable video data, during the time period for the loop recording is performed, e.g., during the time period in which the accessory power source of the vehicle is ON. More specifically, during the time period for which loop recording is performed, e.g., during the time period in which the accessory power source is ON, the recording function control unit 123 keeps recording the video data generated by the video data processing unit 122 in the recording unit 220. When the capacity of the recording unit 220 becomes full, the recording function control unit 123 overwrites the oldest piece of video data with a new piece of video data, to record the new piece of data.

Furthermore, the recording function control unit 123 also stores, when an event is detected by the event detecting unit 127, a piece of video data corresponding to a certain length of time, as non-overwritable event-recorded data, in the recording unit 220, from the video data generated by the video data processing unit 122.

In a configuration in which recording of a video is started in response to a detection of an event, the recording function control unit 123 stores, as the event-recorded data, a piece of video data corresponding to a certain length of time, e.g., equal to or more than 10 seconds and equal to or less than 60 seconds or so, from when the event is detected, in the recording unit 220. During the time period in which the loop-recording is being performed, the recording function control unit 123 stores, as the event-recorded data, a piece of video data corresponding to a certain length of time, e.g., equal to or more than 10 seconds and equal to or less than 60 seconds or so, before and after the event is detected, in the recording unit 220.

When the accessory power source of the vehicle is OFF, that is, while the vehicle is parked, the recording function control unit 123 causes the parking-mode recording function to operate. In other words, the recording function control unit 123 determines that the vehicle is parked, by acquiring a signal indicating that the accessory power source of the vehicle has been turned OFF, from the power information acquiring unit 130. The parking-mode recording function is a function for storing the video data captured by the camera 210, when an event is detected while the vehicle is parked.

In this embodiment, the recording function control unit 123 controls the parking-mode recording function depending on the position where the vehicle is parked. More specifically, if the vehicle is stopped within the field of view of the external camera, the recording function control unit 123 sets the parking-mode recording function to a first mode, and, if the vehicle is parked outside the field of view of the external camera, the recording function control unit 123 sets the parking-mode recording function to a second mode that is different from the first mode. In the first mode of the parking-mode recording function, the process requires a smaller amount of power consumption to operate, compared with that required in the second mode.

The recording function control unit 123 performs the process explained below, as an exemplary way in which the first mode and the second mode of the parking-mode recording function are combined. As the first mode of the parking-mode recording function, the recording function control unit 123 disables the operation of the parking-mode recording function. More specifically, the recording function control unit 123 controls to stop the camera 210 capturing the video, and the accelerometer 250 detecting the acceleration.

As the second mode of the parking-mode recording function, the recording function control unit 123 causes the event detecting unit 127 to detect an event, and causes the camera 210 to start, when a signal indicating that an event is detected is received from the event detecting unit 127, and to keep capturing a video for a predetermined time period after the event is detected. The recording function control unit 123 then stores the captured video data in the recording unit 220, as the event-recorded data.

Alternatively, as the second mode of the parking-mode recording function, the recording function control unit 123 causes the event detecting unit 127 to detect an event, while performing the loop-recording at the same time, and, when a signal indicating that an event is detected is received from the event detecting unit 127, stores video data corresponding to a predetermined time period before and after the event is detected, from the video data being loop-recorded, in the recording unit 220, as the event-recorded data.

Such a recording function control unit 123 disables the operation of the parking-mode recording function, as the first mode of the parking-mode recording function. The second mode of the parking-mode recording function is a mode for causing the event detecting unit 127 to detect an event, and storing the video data corresponding to a predetermined time period after the event is detected by the event detecting unit 127, or for storing video data corresponding to a predetermined time period before and after the event is detected, including the time at which the event is detected by the event detecting unit 127.

The recording function control unit 123 also performs the process explained below, as another exemplary way in which the first mode and the second mode of the parking-mode recording function are combined. As the first mode of the parking-mode recording function, the recording function control unit 123 causes the event detecting unit 127 to detect an event, and causes the camera 210 to start when a signal indicating that an event is detected is received from the event detecting unit 127, and to keep capturing a video for a predetermined time period after the event is detected. The recording function control unit 123 then stores the captured video data in the recording unit 220, as the event-recorded data.

As the second mode of the parking-mode recording function, the recording function control unit 123 causes the event detecting unit 127 to detect an event, while performing the loop recording at the same time, and, when a signal indicating that an event is detected is received from the event detecting unit 127, stores video data corresponding to a predetermined time period before and after the event is detected, as the event-recorded data, in the recording unit 220.

Such a recording function control unit 123 causes the event detecting unit 127 to detect an event, and stores the video data corresponding to a predetermined time period after the event is detected by the event detecting unit 127, as the first mode of the parking-mode recording function. The second mode of the parking-mode recording function is a mode in which the recording function control unit 123 causes the event detecting unit 127 to detect an event, and stores the video data corresponding to a predetermined time period before and after the event is detected, including the time at which the event is detected by the event detecting unit 127.

The replay control unit 124 controls to replay the loop-recorded video data or the event-recorded data recorded in the recording unit 220, based on a control signal corresponding to a replay operation output from the operation control unit 125.

The operation control unit 125 acquires operation information of the operation received by the operation unit 230. For example, the operation control unit 125 acquires storing operation information indicating an operation for manually storing video data, replay operation information indicating an operation for replaying video data, or deleting operation information indicating an operation for deleting video data, and outputs a corresponding control signal. As another example, the operation control unit 125 acquires ending operation information for ending the loop recording, and outputs the corresponding control signal.

The display control unit 126 controls displaying of video data on the display unit 240. The display control unit 126 outputs a video signal for causing a piece of video data to be output on the display unit 240. More specifically, the display control unit 126 outputs a video signal of the video being captured by the camera 210, or a video signal to be displayed by replaying the loop-recorded video data or the event-recorded data recorded in the recording unit 220.

The event detecting unit 127 detects an event on the vehicle based on the detection result of the accelerometer 250. More specifically, the event detecting unit 127 detects an event when an acceleration equal to or higher than a threshold is detected, in the acceleration detected by the accelerometer 250. As the threshold for detecting an event in the parking-mode recording, it is possible to use a threshold lower than that with which an event is detected while the vehicle is running. For example, when the threshold of the acceleration to be detected as an event while the vehicle is driving is set to 1G or so, for example, the threshold of the acceleration to be detected an as an event in the parking mode recording may be set to 0.3G or so.

The position information acquiring unit 128 calculates position information representing the current position of the vehicle, using a known method, based on the electric waves received by the GPS receiver unit 260.

When the recording function control unit 123 determines that the vehicle is parked, the position determining unit 129 determines whether the vehicle is positioned within the field of view of the external camera, based on the position information representing the current position of the vehicle, acquired by the position information acquiring unit 128. In this embodiment, the position determining unit 129 determines whether the vehicle is positioned in a preregistered parking position, based on the position information representing the current position of the vehicle, acquired by the position information acquiring unit 128.

The field of view of the external camera is a range of a setting the video of which can be captured by the external camera. The field of view of the external camera is the field of view of the external camera installed in a parking space in a user's house, or a parking space in a user's working place, for example. The field of view of the external camera includes those of external cameras from which the user can acquire data, among those installed in a parking space in a store, for example. The field of view of the external camera is stored in advance, in a storage unit. It is also possible to acquire the field of view of the external camera from the external camera, for example, when the vehicle is parked, or to transmit the current position information of the vehicle to the external camera when the vehicle is parked, and to acquire information indicating whether the vehicle is within the field of view of the external camera.

The power information acquiring unit 130 acquires information indicating whether the accessory power source of the vehicle is ON or OFF, based on the power being supplied to the vehicular recorder apparatus 10. The power information acquiring unit 130 then outputs the acquired result to the recording function control unit 123.

Figure 2:
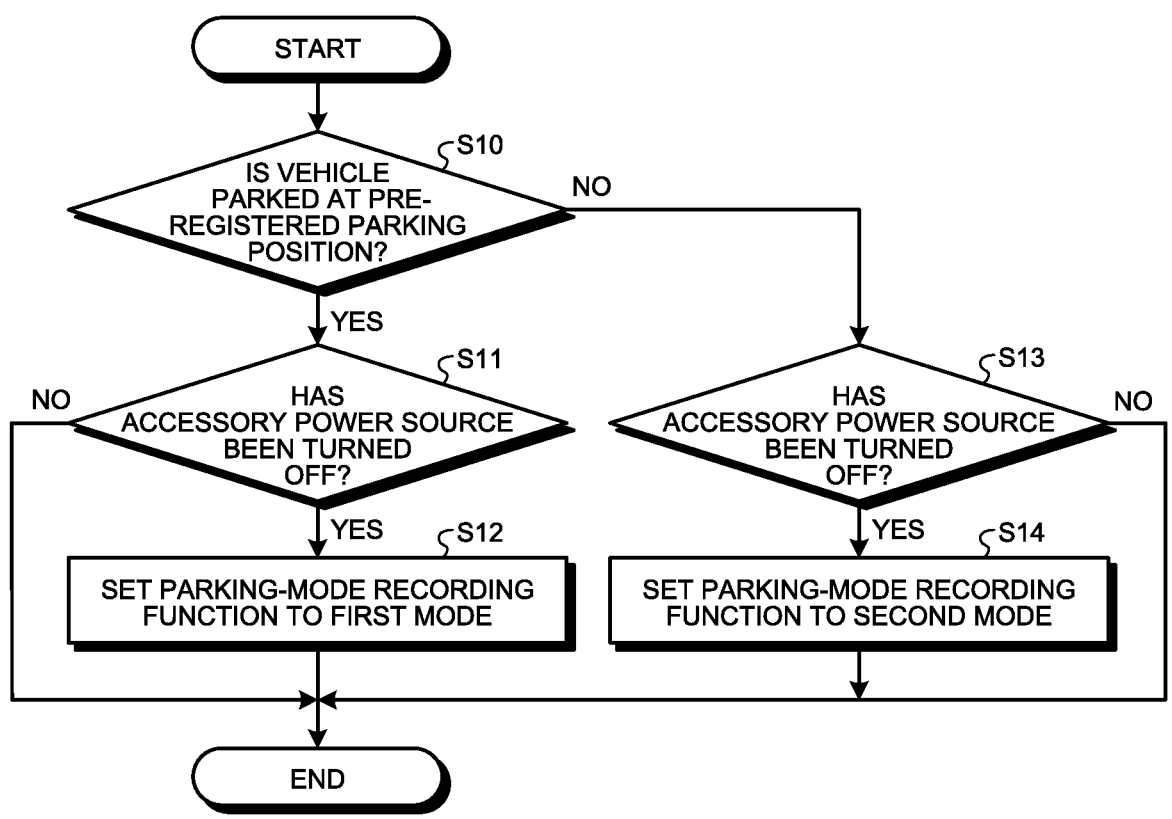
FIG. 2 is a flowchart illustrating the sequence of a process performed by the vehicular recording controller apparatus according to the first embodiment.

The sequence of a process performed by the vehicular recording controller apparatus 100 will now be explained with reference to FIG. 2. FIG. 2 is a flowchart illustrating the sequence of a process performed by the vehicular recording controller apparatus according to the first embodiment. The vehicular recording controller apparatus 100 causes the position information acquiring unit 128 to keep acquiring the position information representing the current position of the vehicle while the vehicle is being operated. The vehicle being operated is a condition in which the vehicle is not parked, e.g., in which the accessory power source of the vehicle keeps supplying power to the vehicular recorder apparatus 10. When the vehicle is stopped, the vehicular recording controller apparatus 100 performs the process illustrated in the flowchart in FIG. 2. It is possible to determine that the vehicle is stopped when the shift lever is brought to the "park" position; when the parking brake is operated; when the speed has remained zero for 5 seconds or longer, for example; or when the engine is stopped. It is also possible to determine that the vehicle is stopped using some trigger such as a user operation.

The vehicular recording controller apparatus 100 determines whether the position where the vehicle is parked is a pre-registered parking position (Step S10). More specifically, the vehicular recording controller apparatus 100 causes the position determining unit 129 to determine whether the vehicle is positioned at a preregistered parking position, based on the position information representing the current position of the vehicle, acquired by the position information acquiring unit 128. If the position determining unit 129 determines that the vehicle is positioned at a preregistered parking position (Yes at Step S10), the vehicular recording controller apparatus 100 shifts the process to Step S11. If the position determining unit 129 determines that the vehicle is not positioned at a preregistered parking position (No at Step S10), the vehicular recording controller apparatus 100 shifts the process to Step S13.

If it is determined that the vehicle is at the pre-registered parking position (Yes at Step S10), the vehicular recording controller apparatus 100 determines whether the accessory power source of the vehicle has been turned OFF (Step S11). If it is determined that the accessory power source has been turned OFF (Yes at Step S11), the vehicular recording controller apparatus 100 shifts the process to Step S12. If it is determined that the accessory power source has not been turned OFF (No at Step S11), the vehicular recording controller apparatus 100 ends the process.

If it is detected that the accessory power source of the vehicle has been turned OFF (Yes at Step S11), the vehicular recording controller apparatus 100 causes the recording function control unit 123 to start the parking-mode recording function in the first mode (Step S12), and ends the process.

If the vehicular recording controller apparatus 100 determines that the vehicle is not positioned at the pre-registered parking position (No at Step S10), the vehicular recording controller apparatus 100 determines whether the accessory power source of the vehicle has been turned OFF (Step S13). If it is determined that the accessory power source has been turned OFF (Yes at Step S13), the vehicular recording controller apparatus 100 shifts the process to Step S14. If it is determined that the accessory power source is not OFF (No at Step S13), the vehicular recording controller apparatus 100 ends the process.

If it is detected that the accessory power source of the vehicle has been turned OFF (Yes at Step S13), the vehicular recording controller apparatus 100 causes the recording function control unit 123 to start the parking-mode recording function in the second mode, and then ends the process.

If the process illustrated in FIG. 2 is ended without setting the parking-mode recording function to the first mode or the second mode in the process illustrated in FIG. 2, this process is executed again when the vehicle stops next time. If the process illustrated in FIG. 2 is ended after the parking-mode recording function is started in the first mode or the second mode, in the process illustrated in FIG. 2, the parking-mode recording function is kept running in the mode started at Step S12 or Step S14, until the vehicle is no longer parked.

Figure 3:
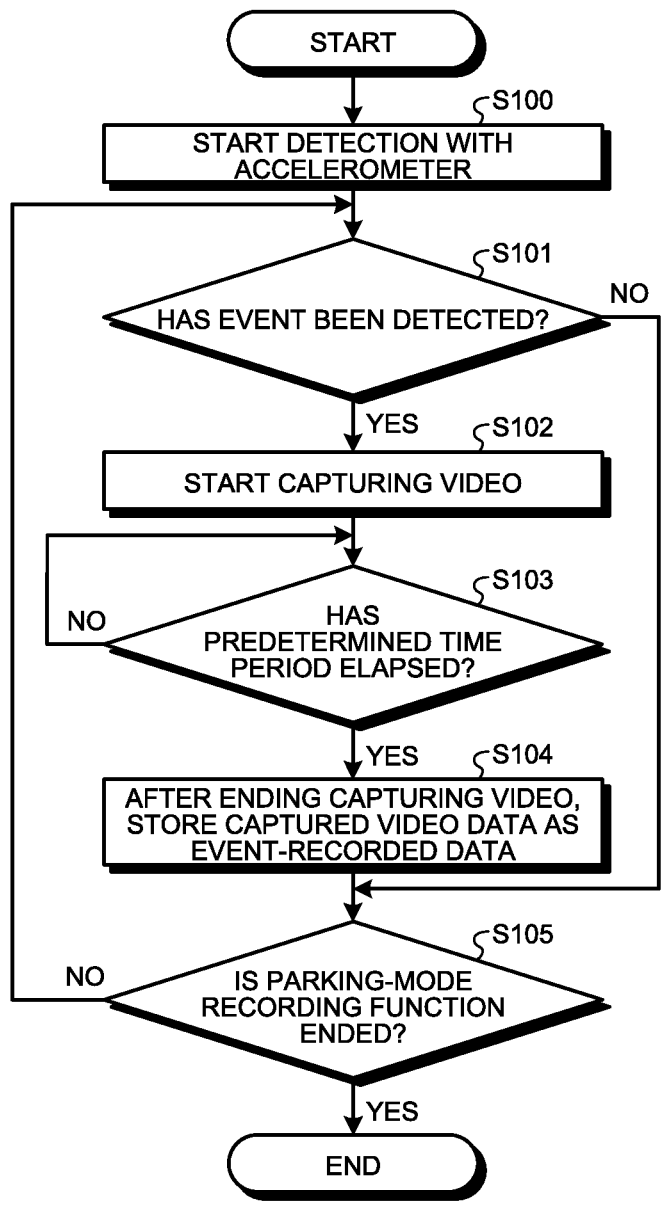
FIG. 3 is a flowchart illustrating the sequence of a process performed by the vehicular recording controller apparatus according to the first embodiment.

The sequence of a process of detecting an event and storing video data, performed as the parking-mode recording function, will now be explained with reference to FIG. 3. FIG. 3 is a flowchart illustrating the sequence of the process performed by the vehicular recording controller apparatus according to the first embodiment. The process illustrated in FIG. 3 corresponds to a process of starting the camera 210 in response to a detection of an event, and of storing video data corresponding to a predetermined time period after the event is detected, as the event-recorded data, in the recording unit 220, in the first mode or the second mode of the parking-mode recording function.

The process illustrated in FIG. 3 is started when the parking-mode recording function is started. The vehicular recording controller apparatus 100 causes the recording function control unit 123 to start detecting an event based on the output of the accelerometer 250 (Step S100), and shifts the process to Step S101.

The vehicular recording controller apparatus 100 then determines whether the event detecting unit 127 has detected an event based on the detection result of the accelerometer 250 (Step S101). More specifically, if the event detecting unit 127 has detected an acceleration equal to or higher than a threshold, the vehicular recording controller apparatus 100 determines that an event has been detected (Yes at Step S101), and shifts the process to Step S102. If the event detecting unit 127 has not detected an acceleration equal to or higher than the threshold, the vehicular recording controller apparatus 100 determines that no event has been detected (No at Step S101), and shifts the process to Step S105.

The vehicular recording controller apparatus 100 then causes the recording function control unit 123 to start capturing a video using the camera 210 (Step S102), and shifts the process to Step S103.

The vehicular recording controller apparatus 100 then determines whether a predetermined time period has elapsed (Step S103). If it is determined that the predetermined time period has elapsed (Yes at Step S103), the vehicular recording controller apparatus 100 shifts the process to Step S104. If it is determined that the predetermined time period has not elapsed yet (No at Step S103), the vehicular recording controller apparatus 100 performs the process at Step S103 again.

The vehicular recording controller apparatus 100 then causes the recording function control unit 123 to store the captured video data in the recording unit 220, as the event-recorded data (Step S104), and shifts the process to Step S105. The event-recorded data stored at Step S104 is video data corresponding to the period from when the video capturing is started at Step S102 to when it is determined that the predetermined time period has elapsed at Step S103, and the video capturing is ended at Step S104.

The vehicular recording controller apparatus 100 then determines whether the parking-mode recording function is ended (Step S105). It is determined that the parking-mode recording function has been ended when it is determined that the accessory power source has been turned ON, or that the parking-mode recording function has been stopped by an operation of the operation unit 230, for example.

At Step S105, if it is determined that the parking-mode recording function has been ended (Yes at Step S105), the vehicular recording controller apparatus 100 ends the process. If it is determined that the parking-mode recording function has not been ended yet (No at Step S105), the vehicular recording controller apparatus 100 shifts the process back to Step S101.

Figure 4:
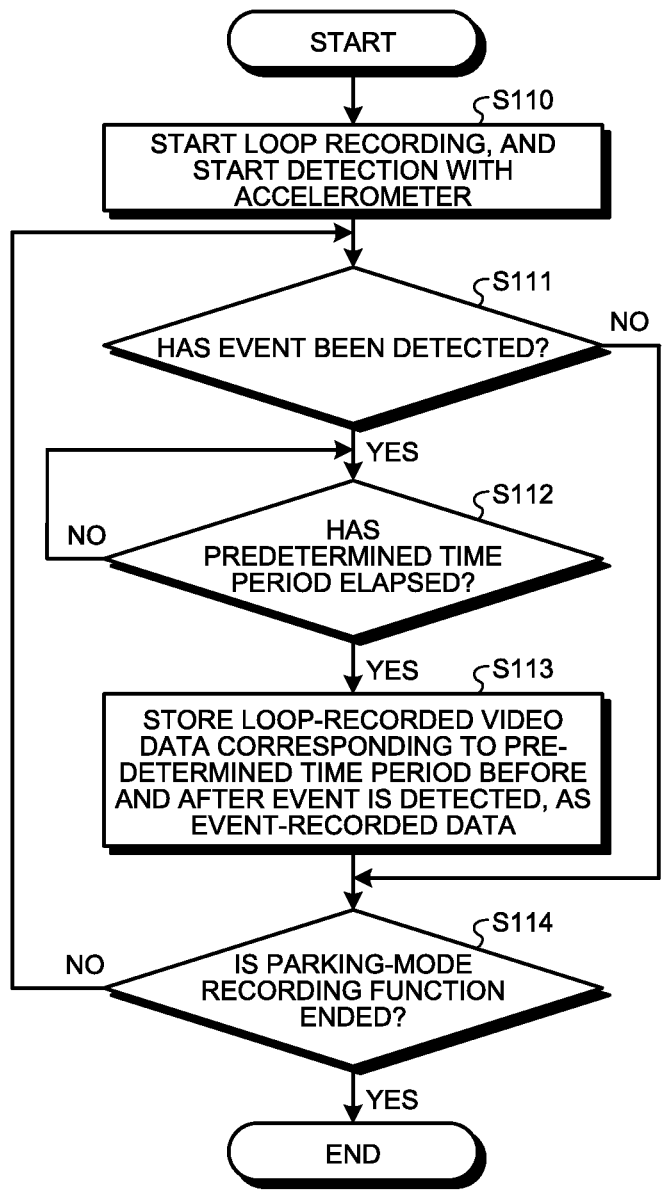
FIG. 4 is a flowchart illustrating the sequence of a process performed by the vehicular recording controller apparatus according to the first embodiment.

The sequence of a process of detecting an event and storing video data with the loop recording, performed as the parking-mode recording function, will now be explained with reference to FIG. 4. FIG. 4 is a flowchart illustrating the sequence of the process performed by the vehicular recording controller apparatus according to the first embodiment. The process illustrated in FIG. 4 corresponds to a process of storing video data corresponding to a predetermined time period before and after the event is detected, in the recording unit 220, as the event detection data, in response to a detection of an event, from the video data being loop-recorded in the second mode of the parking-mode recording function. At Step S111, Step S112, and Step S114 illustrated FIG. 4, the same processes at Step S101, Step S103, and Step S105 in FIG. 3 are performed, respectively.

The process illustrated in FIG. 4 is started when the parking-mode recording function is started. The vehicular recording controller apparatus 100 causes the recording function control unit 123 to start loop recording, and to start detecting an event based on the output of the accelerometer 250 (Step S110), and shifts the process to Step S111.

The vehicular recording controller apparatus 100 then causes the recording function control unit 123 to store video data corresponding to a predetermined time period before and after an event is detected, including the time at which the event is detected, as event-recorded data (Step S113). More specifically, the vehicular recording controller apparatus 100 causes the video data processing unit 122 to generate video data corresponding to a predetermined time period before and after the event is detected, including the time at which the event is detected, as the event-recorded data. If it is determined that the predetermined time has elapsed at Step S112, the vehicular recording controller apparatus 100 causes the recording function control unit 123 to store the event-recorded data corresponding to the predetermined time period before and after the event is detected, including the time at which the event is detected, generated by the video data processing unit 122, in the recording unit 220, and shifts the process to Step S114.

In the manner described above, when the vehicle is parked within the field of view of an external camera, the parking-mode recording function is set to the first mode, and when the vehicle is parked outside the field of view of the external camera, the parking-mode recording function is set to the second mode that is different from the first mode.

As described above, in this embodiment, when the vehicle is parked within the field of view of an external camera, the operation of the parking-mode recording function is disabled, as the first mode of the parking-mode recording function. With this setting, because a video of the setting around the parked vehicle is being captured by the external camera, when some event occurs, for example, the video data of the parked vehicle captured by the external camera can be acquired, as needed. In this manner, according to this embodiment, it is possible to acquire video data capturing a video of the setting around the parked vehicle, regardless of how much remaining amount of the battery charge is available.

Another alternative in this embodiment is to perform the event detection only, when the vehicle is parked within the field of view of the external camera, and to start the camera 210 when an event is detected, and to store the captured video data as the event-recorded data. According to this embodiment, because only the event detection is performed, the power consumption can be reduced, compared with when the loop recording is performed. In this manner, according to this embodiment, the parking-mode recording function can be kept operable for a longer time, compared with when the parking-mode recording function performs the loop recording. Furthermore, when an event is detected, for the video data before the event occurs, it is possible to obtain the video data captured by the external camera while the vehicle is parked. According to this embodiment, because it is possible to acquire the event-recorded data, as well as the video data captured by the external camera, it is possible to more appropriately recognize the setting around the vehicle at the time at which the event is detected.

In this embodiment, the loop recording is executed when the vehicle is parked outside the field of view of the external camera. According to this embodiment, it is also possible to perform only the event detection operation when the vehicle is parked outside the field of view of the external camera, and to cause the camera 210 to start when an event is detected, and to store the captured video data as the event-recorded data. In this manner, according to this embodiment, it is possible to acquire video data in which the setting around the parked vehicle is captured.

In the manner described above, according to this embodiment, it is possible to record a video appropriately while the vehicle is parked, depending on the position where the vehicle is parked.

Second Embodiment

Figure 5:
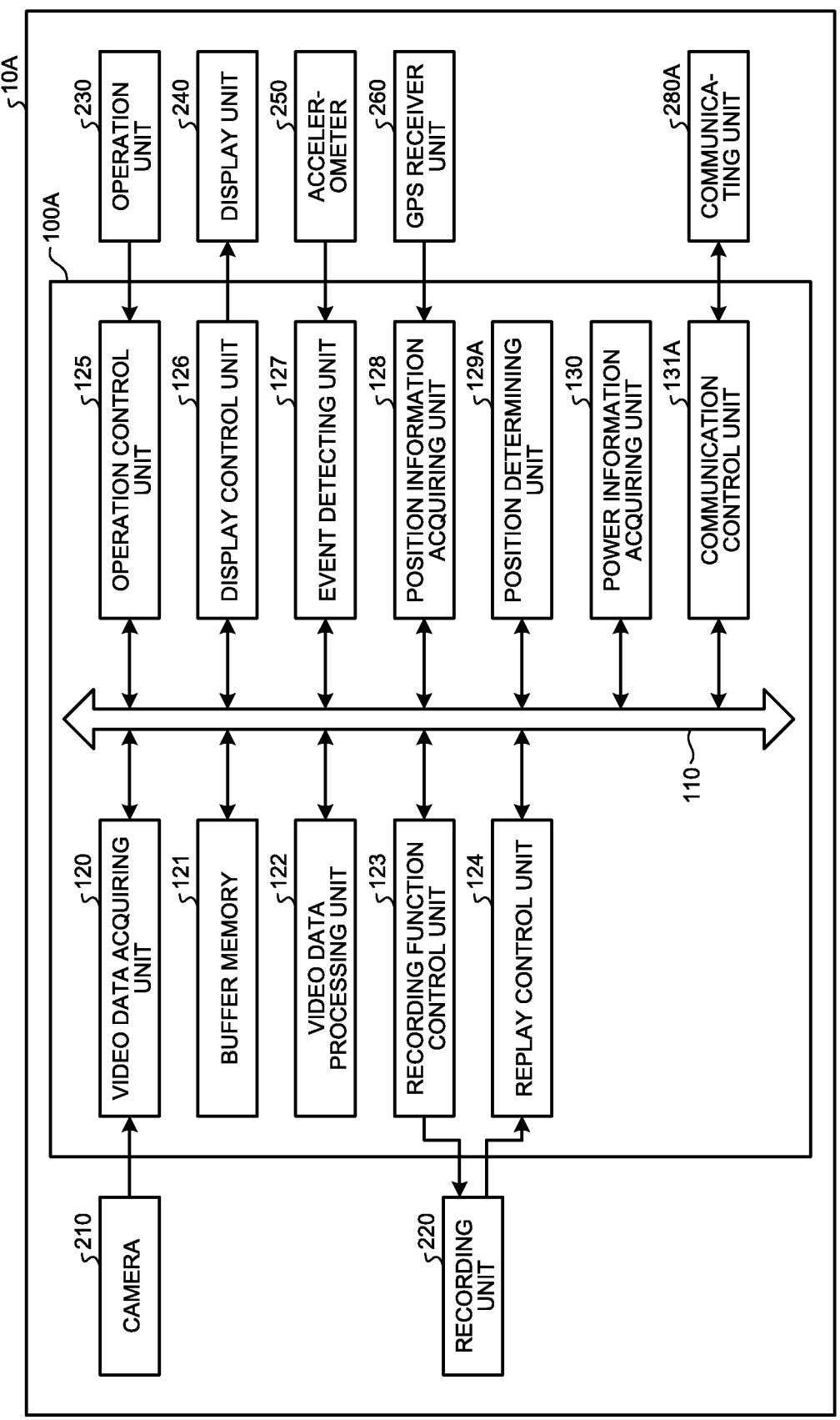
FIG. 5 is a block diagram illustrating an exemplary configuration of a vehicular recorder apparatus including a vehicular recording controller apparatus according to a second embodiment.
Figure 6:
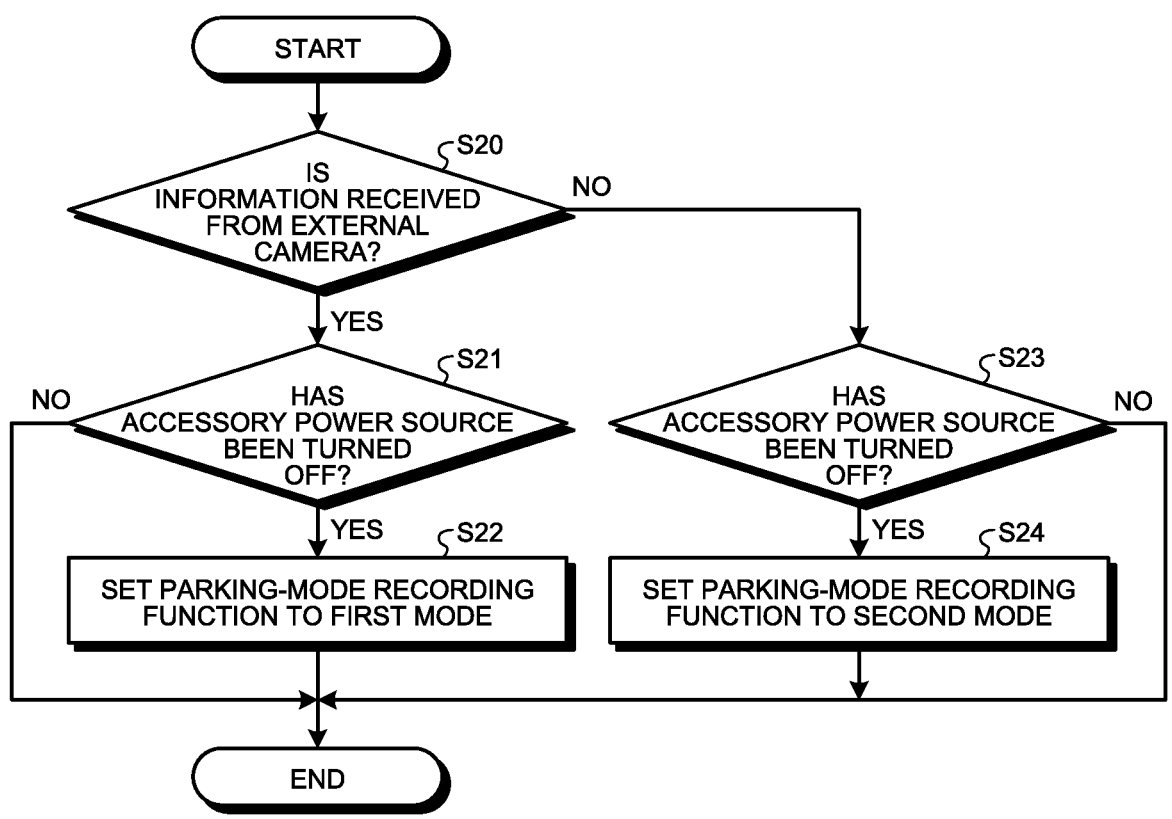
FIG. 6 is a flowchart illustrating the sequence of a process performed by the vehicular recording controller apparatus according to the second embodiment.

A vehicular recorder apparatus 10A according to this embodiment will now be explained with reference to FIGS. 5 and 6. FIG. 5 is a block diagram illustrating an exemplary configuration of a vehicular recorder apparatus including a vehicular recording controller apparatus according to a second embodiment. FIG. 6 is a flowchart illustrating the sequence of a process performed by the vehicular recording controller apparatus according to the second embodiment. The basic configuration of the vehicular recorder apparatus 10A is the same as that of the vehicular recorder apparatus 10 according to the first embodiment. In the explanation below, the same or corresponding reference signs are given to the elements that are the same as those in the vehicular recorder apparatus 10, and detailed explanations thereof will be omitted. The vehicular recorder apparatus 10A is different from the counterpart according to the first embodiment in that a communicating unit 280A and a communication control unit 131A are provided, and the processes performed by a vehicular recording controller apparatus 100A and a position determining unit 129A are different.

The communicating unit 280A is a communication unit that performs near-field wireless communication such as that with Bluetooth (registered trademark). The communicating unit 280A transmits and receives electric waves to and from a communication unit included in the external camera. The communicating unit 280A is capable of communicating with a device within a range of several tens of meters or so. The communicating unit 280A can transmit and receive electric waves when the vehicle is within the field of view of a pre-registered external camera. The communicating unit 280A can also transmit and receive electric waves when the vehicle is positioned at a preregistered parking position.

The communication control unit 131A controls transmissions and receptions of the electric waves, performed by the communicating unit 280A.

The position determining unit 129A determines that the vehicle is positioned at a pre-registered parking position when the communication with the external camera via the communicating unit 280A is available.

The sequence of a process performed by the vehicular recording controller apparatus 100A will now be explained with reference to FIG. 6. For the processes at Step S21 to Step S24, the same processes at Step S11 to Step S14 in the flowchart illustrated in FIG. 2 are performed, respectively.

The vehicular recording controller apparatus 100A determines whether information is received from the external camera (Step S20). More specifically, if a position determining unit 128A determines that the communication control unit 131A has acquired information from the external camera (Yes at Step S20), the vehicular recording controller apparatus 100A shifts the process to Step S21. If the position determining unit 128A determines that the communication control unit 131A has not acquired information from the external camera (No at Step S20), the vehicular recording controller apparatus 100A shifts the process to Step S23.

In this manner, it is determined that the vehicle is positioned at a pre-registered parking position, when the information is received from the external camera.

When the vehicular recording controller apparatus 100A communicates with the external camera, the vehicular recording controller apparatus 100A and the external camera can exchange only the information indicating that the communication is available, and to transmit the parking position information acquired by the position information acquiring unit to the external camera. This is because, although the communicable range of the external camera is within a predetermined radius about the external camera, the area the video of which is captured by the external camera is not always the same as the communicable range. In such a case, the parking position information acquired by the position information acquiring unit is transmitted to the external camera, and the external camera transmits information indicating whether the received parking position information is within the field of view of the external camera, to the vehicular recording controller apparatus 100A. Based on the information indicating whether the received parking position information is within the field of view, the vehicular recording controller apparatus 100A determines whether to set the parking-mode recording function to the first mode or the second mode.

As described above, according to this embodiment, when the information is received from the external camera, it is possible to determine that the vehicle is positioned at a pre-registered parking position. According to this embodiment, it is possible to determine the position where the vehicle is parked more accurately, and to record an appropriate video, while the vehicle is parked.

Third Embodiment

Figure 7:
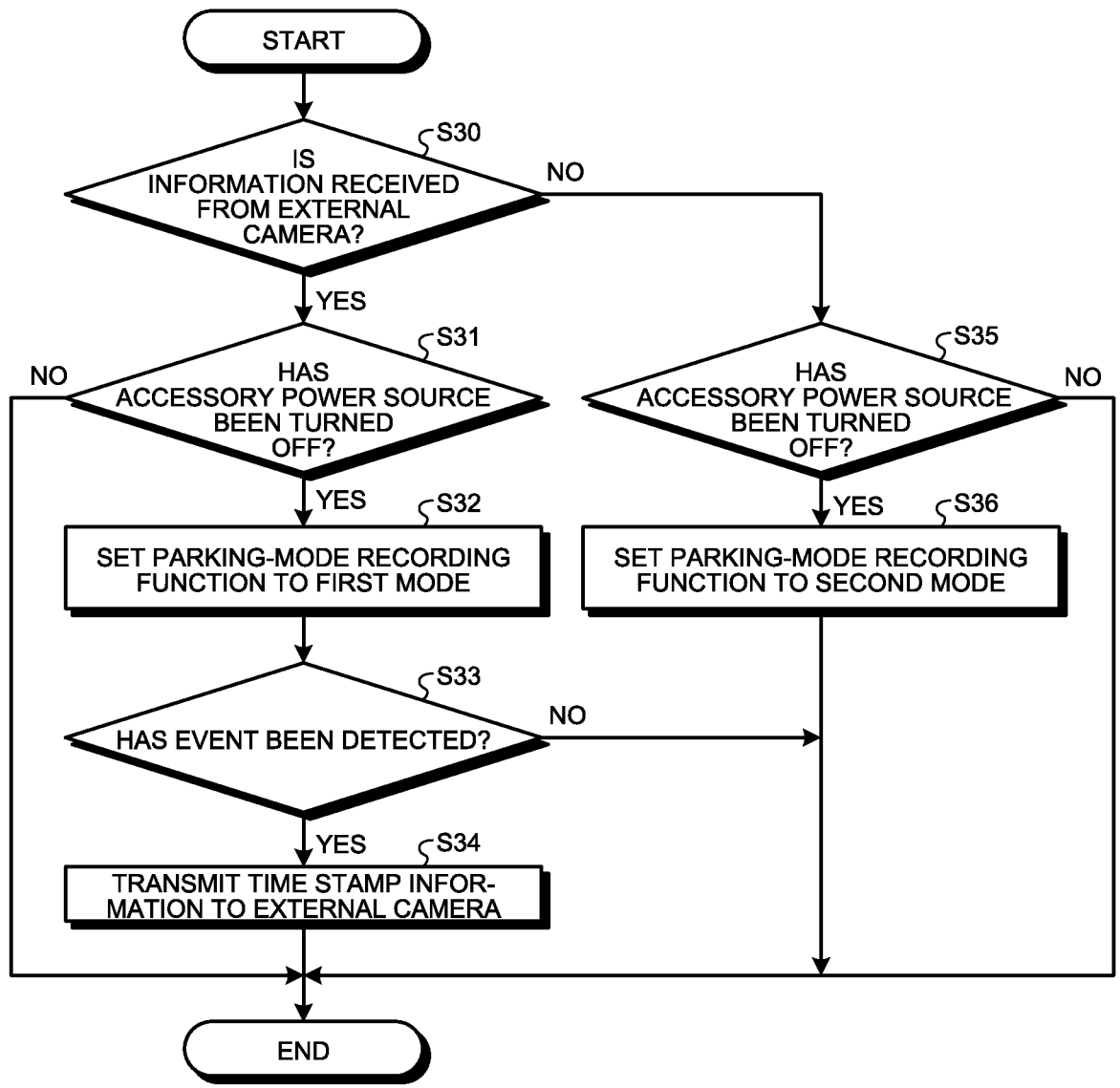
FIG. 7 is a flowchart illustrating the sequence of a process performed by a vehicular recording controller apparatus according to a third embodiment.

The vehicular recorder apparatus 10A according to this embodiment will now be explained with reference to FIG. 7. FIG. 7 is a flowchart illustrating the sequence of a process performed by a vehicular recording controller apparatus according to a third embodiment. The vehicular recorder apparatus 10A has the same basic configuration as that of the vehicular recorder apparatus 10A according to the second embodiment. The vehicular recorder apparatus 10A is different from the counterpart according to the second embodiment in that the process performed by a recording function control unit 123A is different.

When the event detecting unit 127 detects an event while the vehicle is parked, the recording function control unit 123A transmits at least time stamp information indicating the time at which the event is detected, to the external camera.

The sequence of a process performed by the vehicular recording controller apparatus 100A will now be explained with reference to FIG. 7. For processes at Step S30 to Step S32, Step S35, and Step S36, the same processes performed at Step S20 to Step S22, Step S23, and Step S24 in the flowchart illustrated in FIG. 6 are performed, respectively. For a process at Step S33, the same process performed at Step S101 illustrated in FIG. 3 is performed.

If an event has been detected (Yes at Step S33), the vehicular recording controller apparatus 100A causes the communication control unit 131A to transmit the time stamp information to the external camera (Step S34), and ends the process. In FIG. 7, after Step S34, the process explained in FIG. 7 is ended, but in the actual process, the processes at Step S33 and Step S34 are continued until the parking-mode recording function is ended.

In the process illustrated in FIG. 7, when the parking-mode recording function is disabled as the first mode, the event detecting unit 127 causes the event detection function to operate. When an event is detected, the time stamp information indicating the time of the event detection is transmitted to the external camera.

In the process illustrated in FIG. 7, when the vehicular recording controller apparatus 100A is configured, as the first mode, to store video data corresponding to a predetermined time period after the event detecting unit 127 detects an event, capturing of a video is started, as well as the time of an event detection is transmitted to the external camera, when an event is detected.

The external camera sets a flag to a corresponding time in the captured video data, in a manner mapped the received time stamp information. Alternatively, the external camera may extract video data corresponding to a predetermined time period before and after the event is detected, including the time at which the event is detected, based on the received time stamp information, and to store the extracted video data.

As described above, according to this embodiment, it is possible to, when an event is detected, transmit time stamp information indicating the time at which the event is detected, to the external camera. According to this embodiment, it is possible to map a detection of an event having taken place in the vehicle, to the video data captured by the external camera. According to this embodiment, it is possible to easily acquire video data of the setting around the vehicle, the video data being captured by the external camera, and corresponding to a predetermined time period before and after the event is detected, including the time at which the event is detected.

Fourth Embodiment

Figure 8:
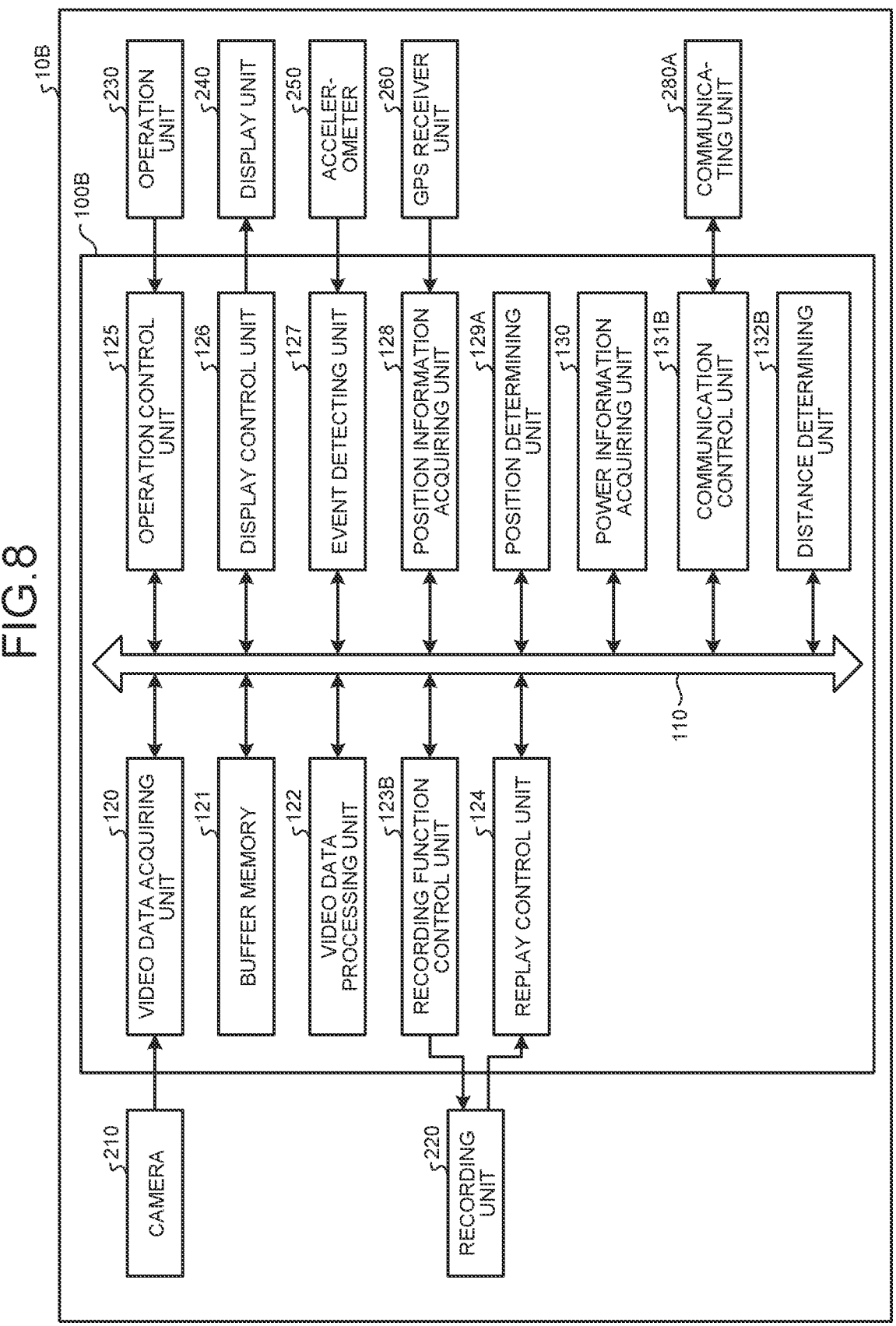
FIG. 8 is a block diagram illustrating an exemplary configuration of a vehicular recorder apparatus including a vehicular recording controller apparatus according to a fourth embodiment.
Figure 9:
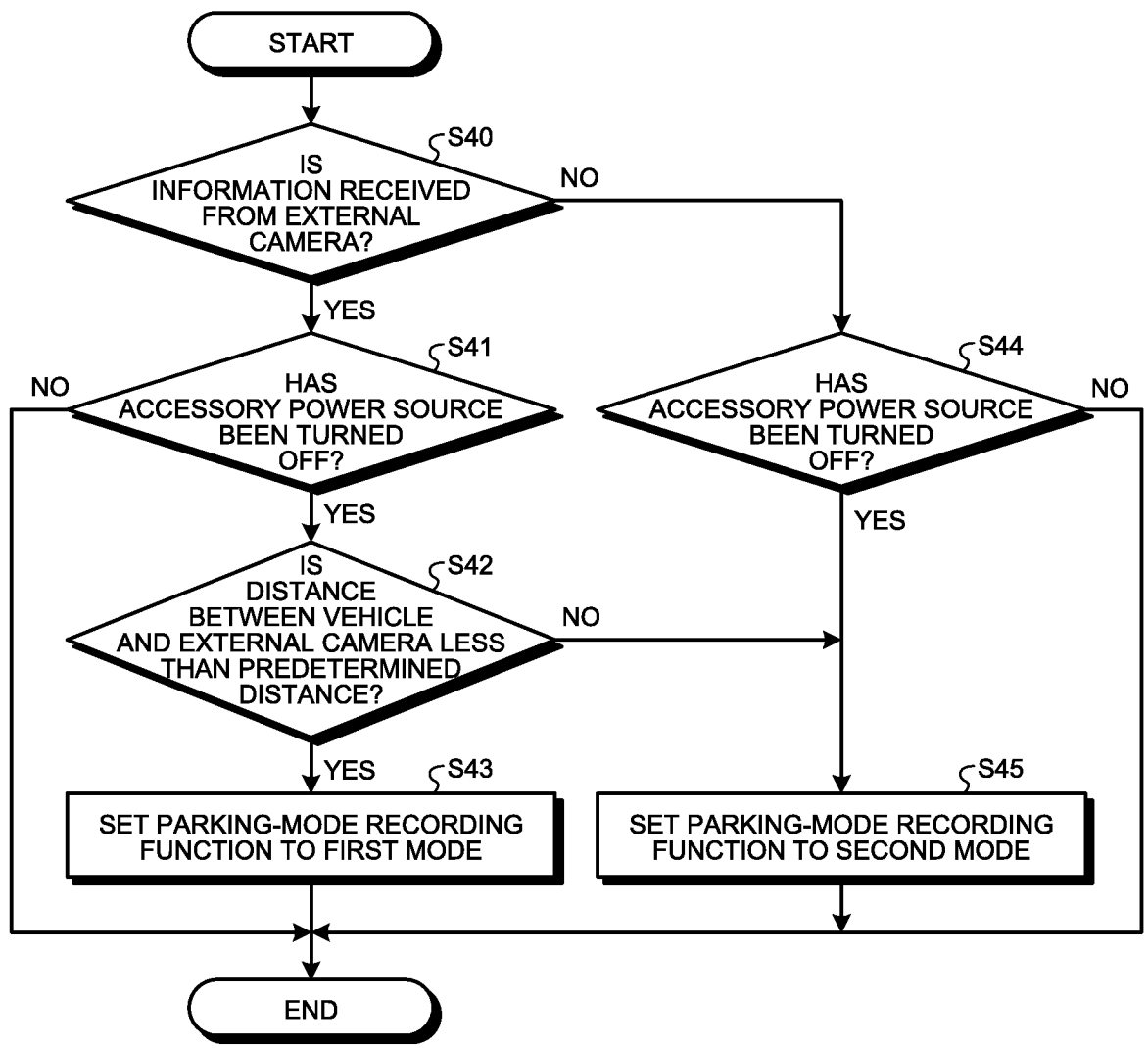
FIG. 9 is a flowchart illustrating the sequence of a process performed by the vehicular recording controller apparatus according to the fourth embodiment.

A vehicular recorder apparatus 10B according to this embodiment will now be explained with reference to FIGS. 8 and 9. FIG. 8 is a block diagram illustrating an exemplary configuration of a vehicular recorder apparatus including a vehicular recording controller apparatus according to a fourth embodiment. FIG. 9 is a flowchart illustrating the sequence of a process performed by the vehicular recording controller apparatus according to the fourth embodiment. This vehicular recorder apparatus 10B has a basic configuration that is the same as that of the vehicular recorder apparatus 10A according to the second embodiment. The vehicular recorder apparatus 10B is different from the second embodiment in that a distance determining unit 132B is provided, and that the process performed by a recording function control unit 123B is different.

The distance determining unit 132B determines whether the distance between the vehicle and the external camera is less than a predetermined distance. More specifically, the distance determining unit 132B may calculate the distance between the vehicle and the external camera based on the position information of the external camera, received from the external camera by a communication control unit 131B. Alternatively, the distance determining unit 132B may calculate the distance between the vehicle and the external camera based on a detection result of a detection sensor not illustrated.

The predetermined distance is set as a distance at which the external camera is capable of capturing a video of the setting around the vehicle to such a degree that a user can recognize the specifics of the setting, in the video captured by the external camera. The degree enabling a user to recognize the specifics of the setting around the vehicle means a degree enabling a user to recognize the license plate of the vehicle, other vehicles, obstacles, or persons around the vehicle. The predetermined distance is set in advance, based on the conditions in which the video is captured, e.g., the image quality achieved by the external camera, and the angle of view of the external camera. The predetermined distance is 30 meters or less or so, for example.

When the vehicle is stopped within the field of view of the external camera, the recording function control unit 123B controls which mode of the parking-mode recording function is to be used, based on the distance between the vehicle and the external camera. If the vehicle is positioned within the field of view of the external camera, but away from the external camera, there are possibilities that the user cannot recognize the specifics of the setting around the vehicle correctly, in the video captured by the external camera. More specifically, if the vehicle is stopped within the field of view of the external camera, and the distance between the vehicle and the external camera is less than a predetermined distance, the recording function control unit 123B sets the parking-mode recording function to the first mode, and if the distance between the vehicle and the external camera is equal to or more than the predetermined distance, sets the parking-mode recording function to the second mode. In this embodiment, if the vehicle is stopped within the field of view of the external camera, and if the distance between the vehicle and the external camera is less than a predetermined distance, the recording function control unit 123B disables the parking-mode recording function, and, if the distance between the vehicle and the external camera is equal to or more than the predetermined distance, sets the parking-mode recording function to a mode for storing the captured data captured by the camera 210, for a time period after an event is detected by the event detecting unit 127.

The sequence of a process performed by a vehicular recording controller apparatus 100B will now be explained with reference to FIG. 9. For the processes performed at Step S40, Step S41, and Step S43 to Step S45, the same processes performed at Step S20, Step S21, and Step S22 to Step S24 in the flowchart illustrated in FIG. 6 are performed, respectively.

If the accessory power source of the vehicle is OFF (Yes at Step S41), the vehicular recording controller apparatus 100B causes the distance determining unit 132B to determine whether the distance between the vehicle and the external camera is less than a predetermined distance (Step S42). If the distance determining unit 132B determines that the distance between the vehicle and the external camera is less than a predetermined distance (Yes at Step S42), the vehicular recording controller apparatus 100B shifts the process to Step S43. If the distance determining unit 132B determines that the distance between the vehicle and the external camera is not less than a predetermined distance (No at Step S42), the vehicular recording controller apparatus 100B shifts the process to Step S45.

In this manner, when the vehicle is parked within the field of view of the external camera, the mode of the parking-mode recording function is controlled based on the distance between the vehicle and the external camera.

As described above, according to this embodiment, it is possible to control the mode of the parking-mode recording function, when the vehicle is parked within the field of view of the external camera, based on the distance between the vehicle and the external camera. According to this embodiment, it is possible to record a more appropriate video depending on the position where the vehicle is parked, while the vehicle is parked.

Fifth Embodiment

A vehicular recorder apparatus 10C according to this embodiment will now be explained with reference to FIGS. 10 and 11. FIG. 10 is a block diagram illustrating an exemplary configuration of a vehicular recorder apparatus including a vehicular recording controller apparatus according to a fifth embodiment. FIG. 11 is a flowchart illustrating the sequence of a process performed by the vehicular recording controller apparatus according to the fifth embodiment. The vehicular recorder apparatus 10C has a basic configuration that is the same as that of the vehicular recorder apparatus 10A according to the second embodiment. The vehicular recorder apparatus 10C is different from the counterpart according to the second embodiment in that an external camera video analyzing unit 133C is provided, and that the process performed by a recording function control unit 123C is different.

The external camera video analyzing unit 133C analyzes the video data captured by the external camera. More specifically, the external camera video analyzing unit 133C acquires the video data captured by the external camera, from information having been acquired from the external camera by a communication control unit 131C. The external camera video analyzing unit 133C then applies image processing to the acquired video data, and determines whether the image of the vehicle is appropriately captured.

The image of the vehicle being captured appropriately means that the camera is capable of capturing the image of the setting around the vehicle, including the vehicle itself. The image of the vehicle being captured appropriately means that the presence of the vehicle within the field of view of the external camera is confirmed in the video. In other words, it means, not only that the vehicle is present within the field of view of the external camera, but also that the vehicle is not hidden behind another object, such as another vehicle, from the viewpoint of the external camera.

The external camera video analyzing unit 133C may have a function for acquiring the result of the vehicle recognition performed in the external camera, via a communicating unit 280C, instead of the function for acquiring and analyzing the video data captured by the external camera.

When the vehicle is stopped within the field of view of the external camera, the recording function control unit 123C analyzes the video data captured by the external camera, determines whether the image of the vehicle is appropriately captured, and controls the mode of the parking-mode recording function. More specifically, if the vehicle is stopped within the field of view of the external camera, and it is determined that the image of the vehicle is appropriately captured, the recording function control unit 123C sets the parking-mode recording function to the first mode, and, if it is determined that the image of the vehicle is not captured appropriately, sets the parking-mode recording function to the second mode.

The sequence of a process performed by a vehicular recording controller apparatus 100C will now be explained with reference to FIG. 11. For the processes performed at Step S50, Step S51, and Step S55 to Step S57, the same processes performed at Step S20, Step S21, and Step S22 to Step S24 in the flowchart illustrated in FIG. 6 are performed, respectively. For the process performed at Step S33, the same process performed at Step S101 illustrated in FIG. 3 is performed.

If the accessory power source of the vehicle is OFF (Yes at Step S51), the vehicular recording controller apparatus 100C causes the external camera video analyzing unit 133C to acquire the video data captured by the external camera (Step S52), and shifts the process to Step S53.

The vehicular recording controller apparatus 100C makes analyses such as that as to whether the image of the vehicle has been captured, by applying image processing to the video data acquired from the external camera (Step S53), and shifts the process to Step S54.

The vehicular recording controller apparatus 100C determines whether the image of the vehicle is appropriately captured based on the result of the analysis performed by the external camera video analyzing unit 133C (Step S54). If it is determined that the image of the vehicle is appropriately captured, based on the analysis performed by the external camera video analyzing unit 133C (Yes at Step S54), the vehicular recording controller apparatus 100C shifts the process to Step S55. If it is determined that that the image of the vehicle is not captured appropriately, based on the analysis result of the external camera video analyzing unit 133C (No at Step S54), the vehicular recording controller apparatus 100C shifts the process to Step S57.

In this manner, when the vehicle is parked within the field of view of the external camera, the video data captured by the external camera is analyzed, and the mode of the parking-mode recording function is controlled based on whether the image of the parked vehicle is appropriately captured.

As described above, according to this embodiment, when the vehicle is parked within the field of view of the external camera, it is possible to control the mode of the parking-mode recording function based on whether the image of the vehicle is appropriately captured, by analyzing the video data captured by the external camera. According to this embodiment, it is possible to record a video more appropriately while the vehicle is parked, based on the video data captured by the external camera.

The vehicular recorder apparatus 10 according to the present disclosure may be implemented in various different configurations other than those described in the embodiments.

The elements of the vehicular recorder apparatus 10 illustrated in the drawings are functional and conceptual representations, and do not necessarily need to be physically configured as illustrated. In other words, the specific configuration of each of the apparatuses is not limited to that illustrated, and the whole or a part thereof may be distributed or integrated functionally or physically to or into any units, depending on the processing load and the utilization of the apparatus.

The configuration of the vehicular recorder apparatus 10 is implemented as software, e.g., as a computer program loaded onto a memory. In the embodiments described above, the configuration is explained to include functional blocks achieved by the pieces of hardware and software working together. In other words, these functional blocks may be implemented in various configurations that use hardware only, software only, or a combination thereof.

The elements described above include those that can be easily thought of by those skilled in the art, or those that are substantially identical. Furthermore, the configurations described above can be combined as appropriate. It is also possible to make various omissions, replacements, or changes, within the scope not deviating from the spirit of the present disclosure.

The present disclosure is made in consideration of the above, and object of the present disclosure is to enable appropriate recording of a video while the vehicle is parked.

According to the present disclosure, a video can be recorded appropriately while the vehicle is parked, advantageously.

What is claimed is:

1. A vehicular recording controller apparatus comprising:
a video data acquiring unit that acquires video data captured by a video capturing unit capturing a video of a setting around a vehicle;
an event detecting unit that detects an event on the vehicle;
a position determining unit that determines whether a position of the vehicle is within a field of view of an external camera making a video available for use by a user of the vehicle; and
a recording function control unit that controls a parking-mode recording function for storing the video data captured by the video capturing unit when the event detecting unit detects the event while the vehicle is parked, wherein
the recording function control unit sets the parking-mode recording function to a first mode when the position determining unit determines that the vehicle is stopped within the field of view of the external camera, and sets the parking-mode recording function to a second mode when the position determining unit determines that the vehicle is stopped outside the field of view of the external camera, wherein
the first mode is a mode for storing captured data that is captured by the video capturing unit over a predetermined time period after the event detecting unit detects the event, and
the second mode is a mode for storing captured data that is captured by the video capturing unit over a predetermined time period before and after the event detecting unit detects the event, including the time at which the event detecting unit detects the event.

2. The vehicular recording controller apparatus according to claim 1, wherein the position determining unit further determines whether the position of the vehicle is at a pre-registered parking position.

3. The vehicular recording controller apparatus according to claim 2, further comprising:
a communicating unit that communicates with the external camera, wherein
the position determining unit determines that the vehicle is positioned at the pre-registered parking position when communication with the external camera via the communicating unit is available.

4. The vehicular recording controller apparatus according to claim 3, wherein the recording function control unit further transmits, when the event detecting unit detects the event while the vehicle is parked, at least time stamp information of the time at which the event is detected, to the external camera.

5. The vehicular recording controller apparatus according to claim 3, further comprising a distance determining unit that determines whether a distance between the vehicle and the external camera is less than a predetermined value, wherein
the recording function control unit further uses a mode for disabling the parking-mode recording function when it is determined that the vehicle is stopped within the field of view of the external camera, and the distance acquired by the distance determining unit is less than the predetermined value, and uses a mode for storing captured data that is captured by the video capturing unit over the predetermined time period after the event detecting unit detects the event, when it is determined that the vehicle is stopped within the field of view of the external camera, and the distance acquired by the distance determining unit is equal to or more than the predetermined value.

6. A vehicular recorder apparatus comprising:
the vehicular recording controller apparatus according to claim 1, the video capturing unit, and a recording unit that stores the video data.

7. A vehicular recording controlling method comprising:
a video data acquisition step of acquiring video data captured by a video capturing unit capturing a video of a setting around a vehicle;
an event detection step of detecting an event on the vehicle;
a position determination step of determining whether a position of the vehicle is within a field of view of an external camera making a video available for use by a user of the vehicle; and
a recording function control step of controlling a parking-mode recording function for storing the video data captured by the video capturing unit when the event is detected at the event detection step, while the vehicle is parked, wherein
at the recording function control step, the parking-mode recording function is set to a first mode when it is determined at the position determination step that the vehicle is stopped within the field of view of the external camera, and the parking-mode recording function is set to a second mode when it is determined at the position determination step that the vehicle is stopped outside the field of view of the external camera, wherein
the first mode is a mode for storing captured data that is captured by the video capturing unit over a predetermined time period after an event detecting unit detects the event, and
the second mode is a mode for storing captured data that is captured by the video capturing unit over a predetermined time period before and after the event detecting unit detects the event, including the time at which the event detecting unit detects the event.

8. A non-transitory computer readable recording medium storing therein a computer program causing a computer operating as a vehicular recording controller apparatus to execute:
a video data acquisition step of acquiring video data captured by a video capturing unit capturing a video of a setting around a vehicle;
an event detection step of detecting an event on the vehicle;
a position determination step of determining whether a position of the vehicle is within a field of view of an external camera making a video available for use by a user of the vehicle; and
a recording function control step of controlling a parking-mode recording function for storing the video data captured by the video capturing unit when the event is detected at the event detection step while the vehicle is parked, wherein
at the recording function control step, the parking-mode recording function is set to a first mode when it is determined at the position determination step that the vehicle is stopped within the field of view of the external camera, and the parking-mode recording function is set to a second mode when it is determined at the position determination step that the vehicle is stopped outside the field of view of the external camera, wherein
the first mode is a mode for storing captured data that is captured by the video capturing unit over a predetermined time period after an event detecting unit detects the event, and
the second mode is a mode for storing captured data that is captured by the video capturing unit over a predetermined time period before and after the event detecting unit detects the event, including the time at which the event detecting unit detects the event.

* * * * *